United States Patent [19]

Lemaire et al.

[11] Patent Number: 5,085,834
[45] Date of Patent: Feb. 4, 1992

[54] METHOD FOR SEPARATING BY USING CROWN COMPOUNDS PLUTONIUM FROM URANIUM AND FROM FISSION PRODUCTS IN THE INITIAL STAGES FOR THE REPROCESSING OF IRRADIATED NUCLEAR FUELS

[75] Inventors: Marc Lemaire, Villeurbanne; Alain Guy, Pontcarre; Jacques Foos, Orsay; Rodolphe Chomel, Orange; Pierre Doutreluigne, Bagnols/Ceze; Thierry Moutarde, Piolenc; Vincent Guyon, Paris; Henri Le Roy, Equeurdreville, all of France

[73] Assignee: Cogema-Compaignie Generale des Matieres Nucleaires, Velizy Villacoublay, France

[21] Appl. No.: 625,551

[22] Filed: Dec. 11, 1990

[30] Foreign Application Priority Data

Dec. 15, 1989 [FR] France ................... 89 16636
Dec. 15, 1989 [FR] France ................... 89 16638

[51] Int. Cl.⁵ .............................. B01D 11/00
[52] U.S. Cl. ........................... 423/8; 423/20; 423/251; 423/253; 252/627; 252/631
[58] Field of Search ............ 252/627, 631; 423/20, 423/8, 251, 253

[56] References Cited

U.S. PATENT DOCUMENTS

| | | | |
|---|---|---|---|
| 4,254,034 | 3/1981 | Van Zon | 549/352 |
| 4,519,996 | 5/1985 | Knochel et al. | 423/249 |
| 4,749,578 | 6/1988 | Davis, Jr. et al. | 252/627 |
| 4,917,825 | 4/1990 | McDowell et al. | 252/631 |
| 5,028,402 | 7/1991 | Foos et al. | 423/8 |

Primary Examiner—Brooks H. Hunt
Assistant Examiner—Ngoclan T. Mai
Attorney, Agent, or Firm—Pearne, Gordon, McCoy & Granger

[57] ABSTRACT

A method for separating plutonium from uranium and from fission products with the aid of crown ether compounds comprising contacting an aqueous solution A0 containing Pu, U and fission products with an organic solvent O0 containing at least one crown ether compound to obtain an organic solution O1 containing Pu and U; extracting U from the organic solution O1 with an aqueous solution A4 such as water or nitric acid to obtain an aqueous solution A5 containing U and an organic solution O3 containing mainly of Pu and recovering Pu from the organic solution using an aqueous solution A6 such as sulfuric acid.

18 Claims, 2 Drawing Sheets

METHOD FOR SEPARATING BY USING CROWN COMPOUNDS PLUTONIUM FROM URANIUM AND FROM FISSION PRODUCTS IN THE INITIAL STAGES FOR THE REPROCESSING OF IRRADIATED NUCLEAR FUELS

FIELD OF THE INVENTION

The invention concerns a method to separate plutonium from uranium and fission products present in an aqueous solution obtained in the first stages for reprocessing irradiated nuclear fuel elements.

BACKGROUND OF THE INVENTION

More specifically, the invention concerns a method in which plutonium is separated from uranium and fission products by using an organic solvent including at least one crown compound.

For several years, the most widely used technique for carrying out the reprocessing of irradiated nuclear fuels consists of dissolving the fuel in a nitric solution, of then placing the aqueous nitric solution obtained in contact with an organic solvent so as to extract from the latter uranium and plutonium and separate them from most of the fission products, of re-extracting the uranium and the plutonium in an aqueous phase and of separating the uranium and the plutonium present in this aqueous phase by using an organic solvent. The organic solvent used most frequently is tributyl phosphate.

Although this solvent provides extremely satisfactory results, it does have the drawback of having insufficient resistance to radiations as it deteriorates via radiolysis in certain products, such as dibutylphosphoric acid, which adversely affect extraction. Moreover, when uranium is separated from plutonium by using this solvent, it is necessary to firstly carry out a stage for reducing the plutonium so as to keep the latter in an aqueous solution and extract the uranium (VI) from the tributyl phosphate. This requires additional stages and the introduction of reducing agents and stabilizers which adversely affect the subsequent processing.

Also, a large number of tests has been conducted on other solvents able to be used so as to overcome these drawbacks.

From those solvents able to be used, crown compounds have been selected as being most suitable as they have an improved affinity for plutonium than tributyl phosphate, they make it possible to separate uranium from plutonium without it being necessary to reduce the plutonium, and also they are more resistant when subjected to irradiation than tributyl phosphate, this crown compound remaining unchanged after irradiation for 140 hrs at a dose rate of 120 krad/hr.

SUMMARY OF THE INVENTION

The object of the present invention is to provide a method to separate plutonium from uranium and fission products (PF) with the aid of crown compounds which make it possible to obtain improved plutonium extraction effectiveness, whilst having the advantage of being able to be used in conventional installations, such as those currently used in plants for the reprocessing of irradiated nuclear fuels.

According to the invention, the method to separate plutonium (IV) from uranium and fission products present in an aqueous solution AO obtained when reprocessing irradiated nuclear fuel elements and containing virtually all the plutonium derived from these elements, includes the following successive stages:

1) placing this aqueous solution AO in contact with an organic solution $O_0$ including at least one crown compound so as to obtain an organic solution $O_1$ containing uranium and plutonium and one aqueous solution $A_1$ containing fission products, 2) re-extracting the uranium extracted in the organic solution $O_1$ by placing this solution in contact with an aqueous solution $A_4$ made up of water or a nitric aqueous solution so as to obtain an aqueous solution $A_5$ containing uranium and an organic solution $O_3$ containing plutonium, and 3) recovering the plutonium present in the organic solution $O_3$ by placing this solution in contact with an aqueous solution $A_6$ of a hydrophilic acid.

The method described above thus makes it possible to obtain the U/Pu/PF separation without any valence cycle with increased selectivity by means of simple extraction followed by washing and re-extraction. In addition, the method does not require that the existing technology be significantly modified.

In fact, with this new organic solution, most of the equipment currently used for the reprocessing of irradiated nuclear fuels may be retained with a few minor modifications.

In the first stage of this method, the uranium and the plutonium in the organic solution $O_0$ are extracted by placing the aqueous solution AO containing uranium, plutonium and fission products in contact with this organic solution which includes the crown compound, whereas the fission products remain for the most part in the aqueous solution.

Generally speaking, the aqueous solution AO is a nitric solution having a nitric acid concentration of 0.8 to 5 mols/l, for example 4.5 mols/l.

In the second stage, the uranium is re-extracted by water or by a nitric acid solution so as to only retain the plutonium in the organic solution.

In this second stage, it is possible to use a nitric solution having a nitric acid concentration of less than 3 mols/l, for example an aqueous solution having a $HNO_3$ concentration of 1 mols/l.

In the final stage for re-extracting plutonium, an aqueous solution of a hydrophilic acid is used able to form a strong complex with Pu.

The hydrophilic acids able to be used are $H_2SO_4$, $H_3PO_4$, HCl and Hf, for example.

For this stage for re-extracting the plutonium, it is preferable to use an aqueous solution containing 0.05 to 2 mols/l of sulphuric acid.

Again, it is preferable to conduct this stage with an excess of sulfate ion with respect to the amount of Pu to be re-extracted, for example an excess so that the ratio of the $SO_4^{2-}$ concentration to the Pu concentration is more than or equals 12. By way of example, it is possible to use an aqueous solution with 0.5 mols/l of $H_2SO_4$.

After re-extracting the plutonium, it is possible to subject the organic solution $O_4$ obtained after this stage to a purification processing so as to reuse it for the first stage for extracting the plutonium.

This processing may consist of washing by an aqueous solution of sulphuric acid having a $H_2SO_4$ concentration exceeding the one used in the stage for re-extracting the Pu, for example a solution with 3 mols/l of $H_2SO_4$.

According to one first variant for embodying the stage for re-extraction of Pu and able to be applied when the solution 03 includes a chlorated diluting agent, the final stage for recovering the plutonium present in the organic solution O3 after re-extraction of the uranium is carried out by placing this solution in contact with water or a low-acidity aqueous solution.

In this case, the stage for re-extracting the uranium is effected by an aqueous nitric solution.

According to a second variant for embodying the stage for re-extraction of Pu, the plutonium present in the organic solution O3 is recovered by diluting this solution O3 with a solvent, this diluted solution being placed in contact with an aqueous solution A6 made up of water or a low-acidity aqueous solution.

According to a third variant for embodying the stage for re-extraction of Pu, this stage for recovering the plutonium present in the organic solution O3 is effected by placing the solution O3 in contact with an aqueous solution of a reducing agent, such as hydroxylamine nitrate.

In the method of the invention, it is possible to use all types of crown compounds, such as those described in the publication by E. Weber and entitled "Crown Compounds—Properties and Practice", p. 34-82. It is also possible to use crown compounds satisfying the following formulae:

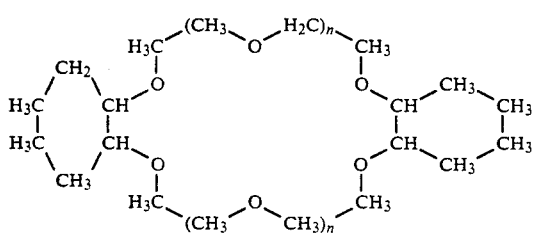

(I)

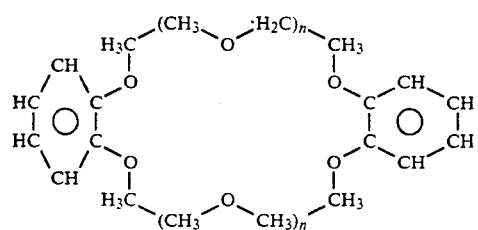

(II)

in which n is equal to 0 or is a whole number ranging from 1 to 4.

By way of examples of such crown compounds, it is possible to cite those of formula (I) in which n=1 (DCH 18C6) or n=2 (DCH 24 C8) and those of formula (II) in which n=1 (DB 18C6) and n=2.

It is also possible to use crown compounds satisfying the following formulae:

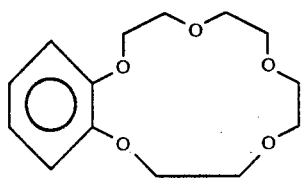

(III)

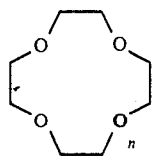

(IV)

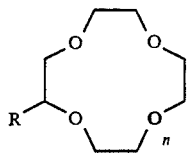

(V)

in which n=0, 1 or 2.

It is preferable to use the crown compound DCH18C6, that is the one satisfying the formula (I) with n=1, either in the form of a mixture of its isomers or in the form of its cis-syn-cis isomer which exhibits a better coefficient for extracting the plutonium, or even in the form of its cis-anti-cis isomer which makes it possible to obtain more plutonium concentrated organic solutions.

In fact, the crown compound satisfying the formula (I) given above, which is known under the name of dicyclohexano-18-crown-6 (DCH18C6), has 5 diastereoisomers having the following structures:

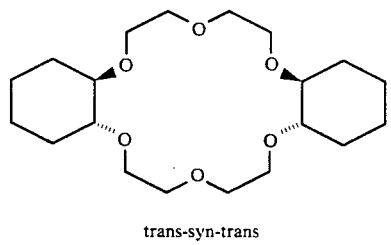

trans-syn-trans

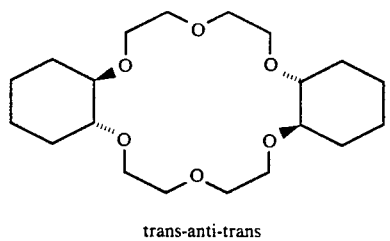

trans-anti-trans

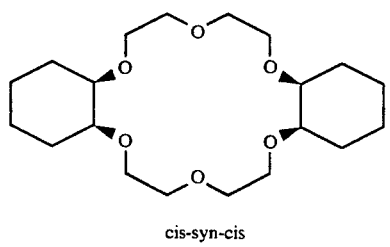

cis-syn-cis

-continued

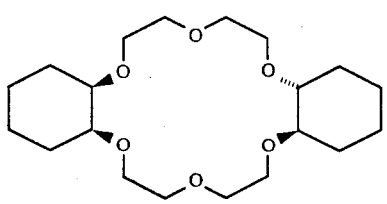

cis-trans

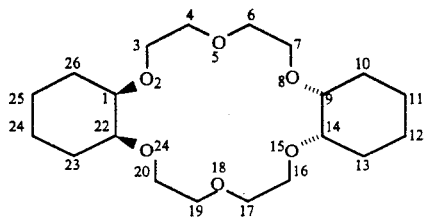

cis-anti-cis
crystalline form B1: 69–70° C.
crystalline form B2: 83–84° C.

The crown compound of formula (I) may be prepared by the catalytic hydrogenation of the dibenzo 18-crown 6; in this case, a mixture of isomers is obtained which mainly contains the cis-syn-cis and cis-anti-cis isomers.

The cis-syn-cis isomer may be separated from this mixture by conventional methods, such as those described by R. M. Izatt and al in J. Amer. Chem. Soc., 93, 1619 (1071) and in Inorganic Chemistry, 14, 3132 (1975) and by C. J. Pedersen in Organic Syntheses, 52, 66. It is also possible to separate the cis-syn-cis and cis-anti-cis isomers by means of a method consisting of:

a) dissolving in an organic solvent a mixture of the isomers of the crown compound including the cis-anti-cis isomer and the cis-syn-cis isomer, b) adding uranyl nitrate to the solution obtained in stage a) in sufficient quantities so that all the isomers of the crown compound, except for the cis-syn-cis isomer, are virtually precipitated in the form of complexes with the uranyl nitrate, c) separating the formed precipitate, d) recovering the pure cis-syn-cis isomer remaining in the solution, and e) recovering the cis-anti-cis isomer from the precipitate separated in stage c).

The cis-syn-cis isomer possesses higher solubility in organic diluting agents than those of the cis-anti-cis isomer and the mixture of isomers, which enables it to be used in organic diluting agents, such as dodecane and baltane or used highly concentrated in organic diluting agents, such as benzonitrile, dichlorethane, chloroform and trichlorethylene.

The cis-syn-cis isomer is thus fully mixable with heptane and dodecane, whereas the cis-anti-cis isomer only possesses a solubility of 10% in heptane or dodecane.

The complexes formed between the uranium and the cis-syn-sis isomer are also more soluble in organic diluting agents than the complexes formed with the cis-anti-cis isomer or with the isomer mixture. Thus, it is possible to use a higher cis-syn-cis isomer concentration as no precipitates are formed when a concentrated solution of uranium salts containing plutonium is placed in contact with a concentrated solution of the cis-syn-cis isomer.

By way of example, a table appears below of the maximum concentrations of the cis-syn-cis isomer in an organic diluting agent and uranyl nitrate in $HNO_3$ 1N which result in a liquid/liquid biphase mixture without any precipitate formation after 3 hrs at 20° C.

| Solvent | DCH18C6 cis-syn-cis (in %) | Maximum concentration of $UO_2(NO_3)_2$ in % of U in $HNO_3$ 1N |
|---|---|---|
| Dodecane | 10% | 12.5% |
| Toluene | 40% | 45% |
| CHCl | 40% | 45% |
| $C_6H_5CN$ | 40% | 45% |

In the same conditions, the cis-anti-cis isomer and the isomer mixture of the DCH18C6 result in a large precipitate of crystallized uranium complexes for extremely small uranium concentrations of less than 5% (P/V).

The choice of the cis-syn-cis isomer may thus be advantageous as in addition the extraction constants of plutonium (IV) by the cis-syn-cis isomer are 2 to 3 times higher than those obtained with the cis-anti-cis isomer or the isomer mixture. On the other hand, the extraction constants of uranium and fission products are roughly the same for the cis-syn-cis isomer, the cis-anti-cis isomer and the isomer mixture. Because of this, splitting ratios are observed, as well as an extraction selectivity much larger for plutonium, and it is possible to obtain a more complete and faster purification of this plutonium.

On the other hand, the solubility in the organic diluting agents of cis-anti-cis Pu-isomer complexes is much greater than that of cis-syn-cis Pu-isomer complexes. Thus, with the cis-anti-cis isomer, it is possible to use much larger organic phase/aqueous phase volume ratios whilst obtaining good results for the extraction of Pu, these results being similar to those obtained with the commercial mixture of isomers.

Also, when the original aqueous solution derives from the first U/Pu/fission products separation cycle, that is when it is less charged with uranium than the solution derived from the fuel dissolution stage, it is preferable to use the cis-anti-cis isomer of the DCH18C6 so as to obtain at the end of the operation an organic solution more concentrated with plutonium.

Generally speaking, the organic solution $O_0$ includes an organic diluting agent possibly selected from chlorated solvents, such as $CHCl_3$, $CH_2Cl_2$, $CCl_3 CH_3$, $CHCl_2 CHCl_2$, $ClCH_2 CH_2 Cl$ and dichlorobenzene, ether, aliphatics and aromatics, such as heptane, dodecane, benzene and alkylbenzenes, nitrobenzene and benzonitrile.

Benzonitrile or dichlorethane is preferably used.

The crown compound concentration of the organic solution $O_0$ may vary within a wide range and in particular depends on the organic diluting agent and the isomer used.

In fact, this concentration needs to be such that a homogeneous organic solution is obtained with crystallization of the crown compound or the crown compound/U and/or Pu complexes.

Generally speaking, a crown compound concentration of the organic solution $O_0$ is used ranging from 0.5 to 40% in weight/volume.

So as to obtain a good fission product decontamination, it is nevertheless preferable to avoid using an extremely high crown compound concentration, as it has been observed with the DCH18C6 that the extracted Pu/extracted fission products ratio increases when the DCH18C6 concentration reduces.

By the way of example, with the cis-anti-cis isomer of the DCH18C6, it is possible to use a 10% weight-/volume crown compound concentration.

According to one preferred embodiment of the method of the invention, at least one additional stage for washing the organic solution O1 carried out, this washing being effected by an aqueous solution A2 before proceeding to the second stage for re-extraction of the uranium by the aqueous solution A4; this makes it possible to eliminate any traces of fission products extracted in the first stage.

This washing may be effected with the aid of a nitric acid solution preferably having a nitric acid concentration of 2 to 5 mols/l. In fact, a high $HNO_3$ concentration is favorable for the re-extraction of fission products. For example, it is possible to use a solution of 4.5N $HNO_3$.

The method of the invention is generally used at atmospheric pressure and at ambient temperature with conventional devices making it possible to place the organic solutions in contact with the aqueous solutions.

Thus, it is possible to use devices ensuring the mixture of the two aqueous and organic phases and then their separation, such as mixer-settlers and co-current or counter-current exchange columns, such as pulsed columns.

The initial aqueous solution AO containing the uranium, plutonium and the fission products is a solution obtained during the first stages for the reprocessing of irradiated fuels. This solution is usually a nitric solution, for example the nitric solution obtained at the time of dissolving the fuels, or the nitric solution obtained after the first uranium separation stage. The nitric acid content of this solution may vary from 0.8 to 5 mols/l. So as to favor extraction of the plutonium, it is preferable that the nitric acid content of this solution be adjusted to a value of at least 4 mols/l, such as 4.5 mols/l.

By way of example of solutions derived from the dissolution of irradiated fuel elements, these may be those containing about 1 g/l of Pu, 200 to 400 g/l of uranium, 600 to 1100 GBq/l of fission products and 0.8 to 5 mols/l of $HNO_3$.

By way of example of solutions obtained after the first uranium/plutonium separation cycle from the fission products, these may be those containing 0.9 to 2.3 g/l of Pu, about 1 g/l of U, 0.7 to 1.5 GBq/l of fission products and 1 to 5 mols/l of $HNO_3$.

When the initial aqueous solution originates from the first cycle for separating the uranium and plutonium from the fission products, it may contain the plutonium in the form of Pu(III) which is not extracted by the crown compounds. In this case, a preliminary stage is then carried out for oxidizing the Pu(III) into Pu(IV), this stage able to be effected with the aid of nitrous vapors, which corresponds to the following reaction:

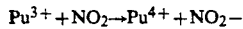
$$Pu^{3+} + NO_2 \rightarrow Pu^{4+} + NO_2-$$

Generally speaking, the method of the invention is implemented by continuously making the aqueous and organic solutions circulate in a suitable installation.

In each stage, it is preferable to place the aqueous solution (A0, A2, A4 or A6) in contact with the corresponding organic solution (O$_0$, O$_1$, O$_2$ or O$_3$) by making the two solutions circulate counter-flow and the aqueous solution A3 obtained after the washing stage is recycled with the aqueous solution A0 to be processed.

Again, the aqueous solution A5 obtained after the uranium re-extraction stage is recycled so as to use it in the stage for washing with the aqueous solution A2.

When functioning continuously, the emission rates of the aqueous solution and the organic solution are selected according to the plutonium concentration of the initial aqueous solution and the plutonium concentration required to be obtained in the organic solution prior to re-extraction of the plutonium. The emission rates ratios may also differ depending on whether this concerns the first stage for extraction of the plutonium, the stage for re-extraction of the uranium, the stage for washing the fission products or the Pu re-extraction stage.

Generally speaking, in the first Pu extraction stage, the emission rate of the aqueous solution (A)/ emission rate of the organic solution (O) ratio is situated in the range extending from 0.5 to 15.

However, so as to improved selectivity of extraction with regard to the Pu, it is preferable to use a high A/O emission rate ratio, for example 12.

As regards the stage for washing the organic solvent with a view to eliminating the fission products, the ratio of the emission rates may be smaller than during extraction of the Pu. By way of example, it is possible to use A/O emission rate ratios extending from 2 to 4.

For the uranium re-extraction stage, it is also possible to use A/O emission rate ratios much smaller than in the first Pu extraction stage, for example an of A/O emission rate ratios of 2.

For the final stage for re-extraction of the plutonium, when this stage is effected with the aid of $H_2SO_4$, it is possible to use a slightly smaller A/O emission rate ratio so as to recover an aqueous solution having a relatively high plutonium concentration. By way of example, it is possible to use an A/O emission rate ratio of 1.

BRIEF DESCRIPTION OF THE DRAWINGS

Other characteristics and advantage of the invention shall appear more readily from a reading of the following description, given by way of illustration and being in way restrictive, with reference to the accompanying drawing on which.

DETAILED DESCRIPTION OF THE PREFERRED EMBODIMENTS

The following example 1 illustrates the processing of an aqueous solution obtained after the first uranium/-plutonium separation cycle at the time of processing irradiated nuclear fuels.

EXAMPLE 1

Figure 1:
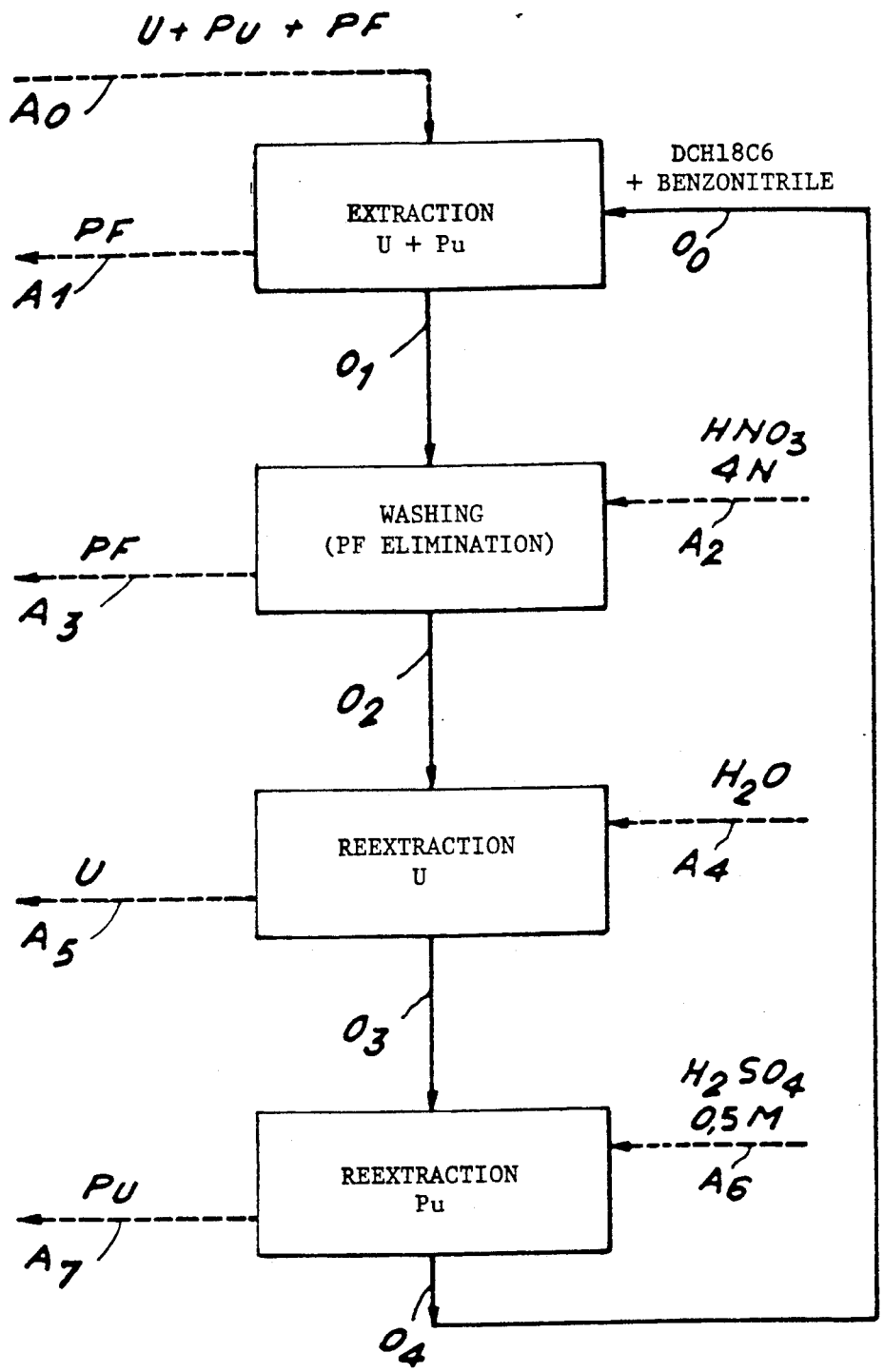
FIG. 1 is a diagram diagrammatically illustrating the method of the invention, and FIG. 2 diagrammatically represents an installation to continuously use the method of the invention with the cis-anti-cis isomer of the DCH18C6.

This example refers to FIG. 1 which diagrammatically illustrates the four successive stages for extraction of the uranium and the plutonium, for washing to eliminate the fission products, for re-extraction of the uranium and for re-extraction of the plutonium.

The full lines relate to the organic solutions, whereas the broken lines relate to the various aqueous solutions.

In the first stage for extracting the uranium and the plutonium, an aqueous solution A0, for example a nitric aqueous solution containing uranium, plutonium and fission products (PF), is placed in contact with the organic solution $O_0$ constituted, for example, by benzonitrile containing 25% (weight/volume) of commercial DCH18C6, that is a mixture of isomers. At the end of the extraction stage, an aqueous solution A1 is therefore recovered containing in particular the fission products and an organic solution O1 which has extracted the uranium and the plutonium. This solution O1 is washed by a 4N nitric acid solution A2 and which is thus recovered in the aqueous solution A3. The organic solution freed of the fission products O2 is then introduced at the uranium re-extraction stage where it is placed in contact with a solution A4 constituted by water, which makes it possible to recover an aqueous solution A5 containing the uranium and an organic solution O3 scarcely containing any more plutonium. This organic solution O3 is introduced at the stage for re-extraction of the plutonium where it is placed in contact with a 0.5M sulfuric acid solution A6, which makes it possible to recover an aqueous solution A7 containing plutonium and an organic solution O4 which may be recycled during the stage for extracting the uranium and the plutonium.

An aqueous solution, obtained after the first cycle for reprocessing irradiated nuclear fuels, is processed in this way and having the following composition:
980 mg/l of uranium,
1319 mg/l of plutonium,
1.27 mCi/l of fission products,
4 mols/l of H+ ions.

The results obtained by processing this solution, according to the diagram described above and by placing in each stage an aqueous solution volume in contact with two volumes of the second organic solution for a period for 10 minutes, are given in the annexed table 1.

In the light of these results, it has been established that, in the first stage, 85% of uranium, 99.6% of plutonium and 31% of fission products were extracted, the first washing stage allowing for the re-extraction of 20% of the fission products, 34.3% of uranium and only 0.64% of the plutonium present in the initial solution A0. A re-extraction of the organic solution by using water makes it possible to recover from the solution A3 48.2% of the uranium only containing 5% of the plutonium and 4.9% of the fission products. A re-extraction by means of sulfuric acid at 0.5 mol/l makes it possible to recover from A4 94% of the initial plutonium only containing 2.5% of uranium and 5.6% of the initial fission products.

Thus, the method of the invention makes it possible to recover a solution A1 highly enriched with fission products (69%), a solution A5 highly enriched with uranium (48%) and a solution A7 containing most of the plutonium (94%) by only requiring one extraction, one washing and two successive re-extractions.

EXAMPLE 2

This example shows the use of the cis-syn-cis isomer of the DC18C6 with a high concentration of 0.134 mols/l in chloroform for the extraction of the plutonium from aqueous nitric solution, also derived from the first cycle for reprocessing irradiated nuclear fuels, which contains:
906 mg/l of uranium (VI)
1360 mg/l of Pu (IV)
5 mols/l of $HNO_3$, and
$18.1 \times 10^7$ mBq/l (4.88 mCi/l) of fission products.

In this case, so as to carry out the first extraction stage, 15 ml of the aqueous solution is placed in contact with 30 ml of the organic extraction solvent and is agitated for 10 minutes. Then, the two phases are separated by decantation, their respective contents of uranium, plutonium and fission products are measured and the splitting coefficients Dm of the uranium, plutonium and the fission products are calculated between the two phases. This splitting coefficient Dm corresponds to the ratio of the concentration of the element in the organic solvent to the concentration of the same element in the aqueous solution.

The results obtained are given in table 2 following.

This table also shows the values of the extraction constants Kex of the plutonium and the uranium which have been calculated from the values obtained.

In the light of this table, it has been observed that the splitting coefficients and the extraction constants of the plutonium are much larger than those of the uranium.

EXAMPLES 3 and 4

The same mode of operation in example 2 is used to process the same aqueous solution but by using as an extraction organic solvent 0.134 mol/l of the cis-anti-cis isomer of the DCH18C6 in chloroform for example 3, and 0.134 mol/l of the isomer mixture of commercial DCH18C6 in chloroform for example 4.

The results obtained with these organic solvents are also given in table 2.

In the light of this table, it has been observed that the cis-syn-cis isomer makes it possible to attain results better than those obtained with the cis-anti-cis isomer or with the isomer mixture.

EXAMPLE 5

In this example, an organic solvent is used constituted by dichlorethane containing 0.134 mols/l of the cis-syn-cis isomer of the DCH18C6 so as to separate the uranium from the plutonium present in an aqueous solution derived from an plant for reprocessing irradiated nuclear fuels, this solution being obtained after the first stage for the uranium/plutonium/fission products extraction and separation stage.

In this example, as shown in FIG. 1, first of all a first extraction is effected by placing in contact two volumes (2 V) of the organic extraction solvent $O_0$ (cis-syn-cis isomer of the DCH18C6 in $C_2H_4Cl_2$) with one volume (1 V) of the aqueous solution A0 to be processed. Thus, a first aqueous solution A1 is recovered which contains scarcely any plutonium, uranium and most of the fission products, and an organic solvent O1 which contains almost all the plutonium, the uranium and scarcely any fission products. Then this organic solvent O1 is subjected to 2 washings by twice its 3N nitric acid volume. After these washings, a third aqueous solution A3 is recovered which contains the uranium, scarcely any plutonium and the fission products, and a second organic solvent O2 which contains plutonium, uranium and hardly any fission products.

After this washing, the uranium is re-extracted by water by placing the organic solvent O2 in contact with twice its volume of water. Thus, a third organic solvent O3 is obtained which contains very little uranium and fission products and more plutonium, and an aqueous solution A5 which contains uranium and hardly any plutonium and fission products.

An aqueous solution A0, having the composition given in the annexed table 3, is processed by an organic solvent $O_0$ constituted by dichlorethane $CH_2Cl\text{-}CH_2Cl$ containing 0.134 mols/l of the cis-syn-cis isomer of the DCH18C6 by using the volume ratios given above. The results obtained, expressed in the form of the uranium, plutonium and fission products contents of the organic solvents O2 and O3 and of the aqueous solution A5, are given in table 3.

In the light of this table, it has been observed that the plutonium has been extracted quantitatively since 99.8% of the initial plutonium in the organic solvent O2 is obtained. The washing with nitric acid makes it possible to eliminate the fission products. When washing with water, that is re-extraction, the uranium (VI) is virtually re-extracted in full, whereas the plutonium (IV) remains in the organic solvent.

The plutonium may therefore be separated from the fission products and from the uranium without the need for any valence cycle and it may be recovered in the organic solvent O3 via re-extraction in an aqueous solution of a hydrophilic acid or in an aqueous solution of a reducing agent, such as hydroxylamine nitrate.

EXAMPLE 6 AND COMPARATIVE EXAMPLE 1

In these examples, the same mode of operation of example 5 is used so as to proces an aqueous solution identical to that of example 5, but by using as an organic solvent the isomer mixture of the DCH18C6 at 25% (P/V) in chloroform in example 6 and 25% of tributylphosphate (TBP) in dodecane in the comparative example 1.

The results obtained in these conditions are also given in table 3.

In the light of these results, it appears advantageous to use the cis-syn-cis isomer of the DCH18C6.

In fact, the use of the TBP makes it possible to extract most (92.5%) of the plutonium, but neither acid washings nor aqueous washing make it possible to obtain a uranium/plutonium separation and, because of this, the final recovery percentage is relatively small (52%) in the aqueous phase A5.

The use of the isomer mixture of the DCH18C6 in chloroform makes it possible to have a more complete extraction of the plutonium (98.4%), but several nitric washings do not make it possible to obtain the plutonium/uranium separation and, during extraction with water, all the plutonium (98%) and the uranium (61%) reappear in the aqueous phase A5.

On the other hand, the use of the cis-syn-cis isomer of the DCH18C6 in dichlorethane allows for a full extraction (99.8%) of the plutonium. Moreover, the nitric washing and a washing with water result in the uranium/plutonium separation and allow for a significant decontamination. The plutonium is thus recovered without any uranium and without any use of valence change in the aqueous phase A5.

EXAMPLES 7 TO 9

In these examples, the results obtained are also compared by using as an organic solution the organic solution $O_0$ of the chloroform containing 0.67 mol/l of DCH18C6:
in the form of the cis-syn-cis isomer (ex. 7)
in the form of the cis-anti-cis isomer (ex. 8)
in the form of the commercial isomer mixture (ex. 9).

In these examples, if reference is made to FIG. 1, the first stage for extraction of U and Pu by the organic solution O is effected followed by the stage for re-extracting the uranium by a nitric solution 1N (A4) and finally followed by the stage for re-extracting the plutonium by water (A6) in accordance with the first variant for implementing the method of the invention.

In these various stages, the volume ratios A/O are:
0.5 for extraction,
1 for re-extraction of the uranium, and
2 for re-extraction of the plutonium.

The results obtained concerning an aqueous solution AO derived from the first U/Pu/fission products separation cycle are given in the annexed table 4.

The method of the invention also makes it possible to separate the plutonium from the uranium and the fission products more effectively and quicker than currently used methods. Moreover, there is no need for any valence change to ensure uranium/plutonium separation.

Furthermore, the crown compounds used in the invention are much more resistant than tributylphosphate on irradiation.

In fact, a solution of DCH18C6 containing Pu(IV), U(VI) and fission products corresponding to an activity of 80 mGy/h, which has been retained for 8 months, which corresponds to a total energy of 611 kJ/mol with an emission of 80.5 kJ/mols, does not cause the DCH18C6 to deteriorate. This means that DCH18C6 may resist at least 5000 extractions of high-activity solutions.

Figure 2:
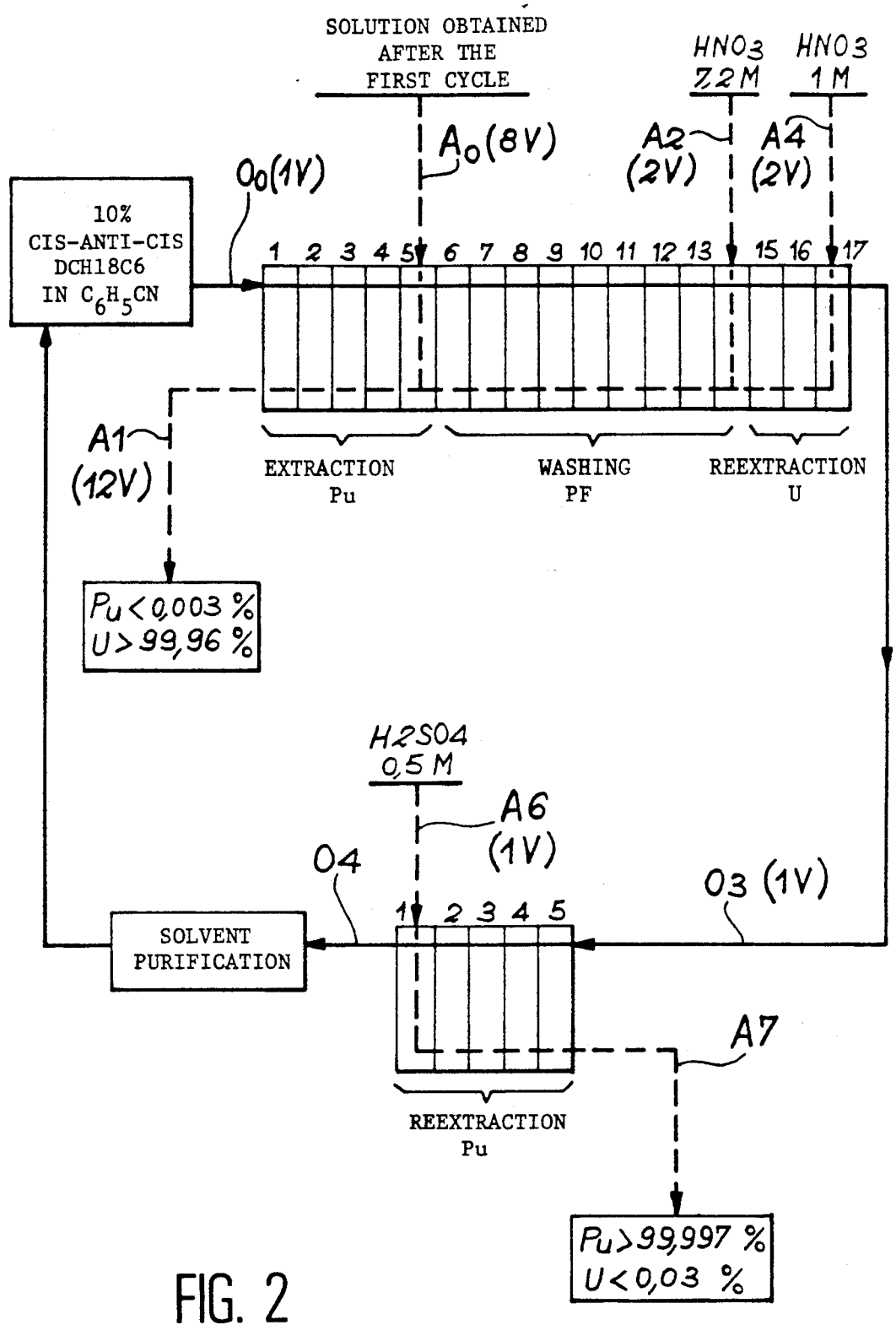

FIG. 2 diagrammatically shows an installation to continuously use the method of the invention on the aqueous solution derived from the first U/Pu/fission products separation cycle embodied with the aid, for example, of tributylphosphate.

This figure makes use of the same references as on FIG. 1 to denote the aqueous and organic solutions introduced into and leaving the installation with their volumes specified in brackets.

In this installation, which includes several stages in which the solutions circulate counter-flow, namely:
the stage for extraction of the plutonium includes 5 sub-stages,
the stage for washing by HNO includes 9 sub-stages,
the stage for re-extraction of the uranium includes 3 sub-stages, and
the stage for re-extraction of the plutonium includes 5 sub-stages.

By using an organic solution $O_0$ constituted by the cis-anti-cis isomer of the DCH18C6 at 10% (P/V) in benzonitrile, an aqueous solution A2 for the washing of fission products and constituted by 2 volumes of 7.2M $HNO_3$ and 2 V of IM $HNO_3$ derived from A4, a solution A4 for re-extracting the uranium and constituted by 1M $HNO_3$ and a solution A6 for re-extraction of the Pu and constituted by 0.5M $H_2SO_4$, it is possible to obtain at the outlet of the installation an aqueous solution A1 containing 99.96% of the initial uranium and less than 0.003% of the initial Pu, and an aqueous solution A7 containing more than 99.997% of the initial Pu and less than 0.03% of the initial U.

The organic solvent O4 is then recycled to the extraction stage following a suitable purification processing by washing with 3 molS/l of $H_2SO_4$, for example.

TABLE 1

COMPOSITIONS OF AQUEOUS SOLUTIONS A0, A1, A3, A5 AND A7

|   | $A_0$ | $A_1$ | $A_3$ | $A_5$ | $A_7$ |
|---|---|---|---|---|---|
| U | 980 mg/l (100%) | 144 mg/l (14.7%) | 336.14 mg/l (34.3%) | 472.36 mg/l (48.2%) | 22.34 mg/l (2.28%) |
| Pu | 1319 mg/l (100%) | 0.48 mg/l (0.37%) | 8.44 mg/l (0.64%) | 67.66 mg/l (5.13%) | 1239.86 mg/l (94%) |
| FP | 1.27 mCi/l (100%) | 0.87 mCi/l (69%) | 0.26 mCi/l (20.6%) | 0.06 mCi/l (4.9%) | 0.07 mCi/l (5.6%) |

TABLE 2

|   | $D_m$(Pu) | $D_m$(U) | $D_m$(PF) | $K_{Pu}$ mol$^{-6}$l$^6$ | $K_U$ mol$^{-3}$l$^3$ |
|---|---|---|---|---|---|
| Ex. 2 0.134 moL/L cis-syn-cis in CHCL$_3$ | 51 | 1.9 | 0.022 | 477 | 6.4 |
| Ex. 3 0.134 mol/L of cis-anti-cis in CHCL$_3$ | 20 | 1.5 | 0.012 | 140 | 4.0 |
| Ex. 4 0.134 mol/L DCH of commercial 18C6 in CHCL$_3$ | 23 | 1.6 | 0.014 | 250 | 4.0 |

TABLE 3

|   | Ex. | Organic Solution | U mg/l | U (%)[1] | Pu mg/l | Pu (%)[1] | PF mCi/l | PF (%) |
|---|---|---|---|---|---|---|---|---|
| $A_0$ | 5 | cis-syn-cis/C$_2$H$_4$Cl$_2$ |  |  |  |  |  |  |
|  | 6 | DCH18C6/CHCl$_3$ | 1236 | (100) | 2400 | (100) | 4.51 | (100) |
|  | comp. 1 | TBP/C$_{12}$H$_{26}$ |  |  |  |  |  |  |
| $O_2$ | 5 | cis-syn-cis/C$_2$H$_4$Cl$_2$ | 697.1 | (56.4) | 2395 | (99.8) | 0.428 | (9.5) |
|  | 6 | DCH18C6/CHCl$_3$ | 750.2 | (60.7) | 2361 | (98.4) | 0.10 | (2.3) |
|  | comp. 1 | TBP/C$_{12}$H$_{26}$ | 1181.6 | (95.6) | 2220 | (92.5) | 0.78 | (17.5) |
| $O_3$ | 5 | cis-syn-cis/C$_2$H$_4$Cl$_2$ | 12.36 | (1) | 2304 | (98) | 0.008 | (0.18) |
|  | 6 | DCH18C6/CHCl$_3$ | 12.36 | (1) | 0.24 | (0.01) | 0.005 | (0.11) |
|  | comp. 1 | TBP/C$_{12}$H$_{26}$ | 716.9 | (58) | 984 | (41) | 0.22 | (5.0) |
| $A_5$ | 5 | cis-syn-cis/C$_2$H$_4$Cl$_2$ | 352.26 | (28.5) | 100.8 | (4.2) | 0.005 | (0.11) |
|  | 6 | DCH18C6/CHCl$_3$ | 753.96 | (61) | 2352 | (96) | 0.094 | (2.1) |
|  | comp. 1 | TBP/C$_{12}$H$_{26}$ | 469.68 | (38) | 1248 | (52) | 0.56 | (12.5) |

[1] Content expressed in % of the content in the initial solution $A_0$

TABLE 4

| Ex. | Organic solution $O_0$ DCH18C6 0.67 mol/l in CHCl$_3$ |  | A1 |  | A5 |  | A7 |
|---|---|---|---|---|---|---|---|
| Ex. 7 | Cis-syn-cis isomer | Pu | 2% | Pu | 6% | Pu | 92% |
|  |  | U | 35% | U | 31% | U | 34% |
|  |  | PF* | 98% | PF* | 1% | PF* | 0.2% |
| Ex. 8 | Cis-anti-cis isomer | Pu | 4.6% | Pu | 18% | Pu | 80% |
|  |  | U | 40% | U | 40% | U | 20% |
|  |  | PF* | 98% | PF* | 1% | PF* | 0.2% |
| Ex. 9 | Isomer mixture | Pu | 4.2% | Pu | 10% | Pu | 85% |
|  |  | U | 40% | U | 40% | U | 17% |
|  |  | PF* | 98% | PF* | 1% | PF* | 0.2% |

*Fission products

What is claimed is:

1. Method to separate plutonium (IV) from uranium and fission products present in an aqueous solution AO obtained when reprocessing irradiated nuclear fuel elements and containing almost all the plutonium derived from these elements, wherein it includes the following successive stages:

1) placing the aqueous solution AO in contact with an organic solution $O_0$ including at least one crown compound so as to obtain an organic solution O1 containing uranium and plutonium, and an aqueous solution A1 containing fission products, 2) re-extracting the uranium extracted from the organic solution O1 by placing the solution O1 in contact with an aqueous solution A4 constituted by water or a nitric aqueous solution so as to obtain an aqueous solution A5 containing uranium and an organic solution O3 containing plutonium, and 3) recovering the plutonium present in the organic solution O3 by placing the solution in contact with an aqueous solution A6 of a hydrophilic acid.

2. Method according to claim 1, wherein the hydrophilic acid is either H$_2$SO$_4$, H$_3$PO$_4$, HCl or HF.

3. Method according to claim 2, wherein the solution A6 is an aqueous solution containing 0.05 to 2 mols/l of sulfuric acid.

4. Method to separate plutonium (IV) from uranium and fission products present in an aqueous solution AO obtained when reprocessing irradiated nuclear fuel elements and containing almost all the plutonium derived from these elements, wherein it includes the following successive stages:

1) placing the aqueous solution AO in contact with an organic solution $O_0$ including at least one crown compound and one chlorated diluting agent so as to obtain an organic solution O1 containing uranium and plutonium, and an aqueous solution A1 containing fission products, 2) re-extracting the uranium extracted from the organic solution O1 by placing the solution in contact with an aqueous solution A4 constituted by a nitric aqueous solution so as to obtain an aqueous solution A5 containing uranium, and an organic solution O3 containing plutonium, and 3) recovering the plutonium present in the organic solution O3 by placing the solution O3 in contact with an aqueous solution A6 constituted by water or a low-acidity aqueous solution.

5. Method to separate plutonium (IV) from uranium and the fission products present in an aqueous solution AO obtained when reprocessing irradiated nuclear fuel elements and containing almost all the plutonium originating from these elements, wherein it includes the following successive stages:

1) placing the aqueous solution A0 in contact with an organic solution $O_0$ including at least one crown compound so as to obtain an organic solution O1 containing uranium and plutonium and an aqueous solution A1 containing fission products, 2) re-extracting the uranium extracted from the organic solution O1 by placing the solution in contact with an aqueous solution A4 constituted by water or a nitric aqueous solution so as to obtain an aqueous solution A5 containing uranium and an organic solution O3 containing plutonium, and 3) recovering the plutonium present in the organic solution O3 by diluting the solution O3 with a solvent and by placing this diluted solution in contact with an aqueous solution A6 constituted by water or a low-acidity aqueous solution.

6. Method to separate plutonium (IV) from uranium and fission products present in an aqueous solution AO obtained when reprocessing irradiated nuclear fuel elements and containing almost all the plutonium derived from these elements, wherein it includes the following successive stages:

1) placing the aqueous solution AO in contact with an organic solution O0 including at least one crown compound so as to obtain an organic solution O1 containing uranium and plutonium, and an aqueous solution A1 containing the fission products, 2) re-extracting the uranium extracted from the organic solution O1 by placing the solution O1 in contact with an aqueous solution A4 constituted by water or by a nitric aqueous solution so as to obtain an aqueous solution A5 containing the uranium and an organic solution O3 containing the plutonium, and 3) recovering the plutonium present in the organic solution O3 by placing the solution in contact with an aqueous solution A6 of a reducing agent.

7. Method according to any one of claims 1 to 6, wherein for re-extraction of the uranium, an aqueous solution is used having a nitric acid concentration of less than 3 mols/l.

8. Method according to any one of claims 1, 4, 5 and 6, wherein the crown compound satisfies the formulae:

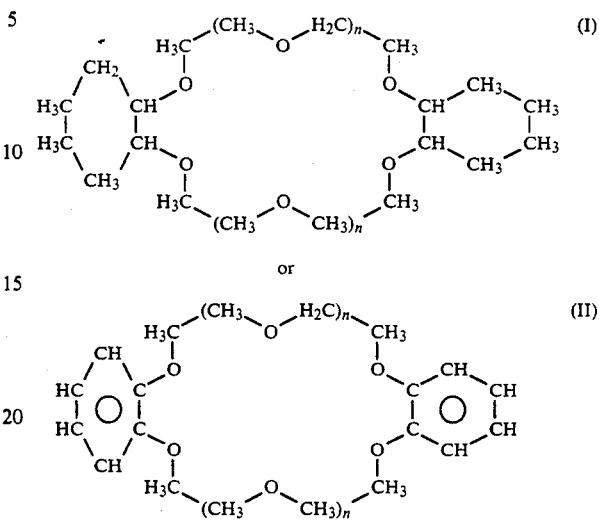

in which n is equal to 0 or is a whole number ranging from 1 to 4.

9. Method according to claim 8, wherein the crown compound satisfies the formula (I) with $n=1$.

10. Method according to claim 9, wherein the crown compound is the cis-syn-cis isomer of the crown compound of formula (I) in which $n=1$.

11. Method according to claim 9, wherein the crown compound is the cis-anti-cis isomer of the crown compound of formula (I) in which $n=1$.

12. Method according to any one of claims 1, 5 and 6, wherein the organic solution $O_0$ includes a diluting agent constituted by benzonitrile.

13. Method according to any one of claims 1, 4, 5 and 6, wherein the crown compound concentration of the organic solution O0 is 0.5 at 40% in weight/volume.

14. Method according to any one of claims 1, 4, 5 and 6, wherein at least one additional stage is effected for washing the organic solution O1 with an aqueous solution A2 of nitric acid to obtain an organic solution O2 and an aqueous solution A3 before proceeding to the second stage for the uranium being re-extracted by the aqueous solution A4.

15. Method according to claim 14, wherein the washing solution A2 is a 2 to 5N nitric acid solution.

16. Method according to any one of claims 1, 4, 5 and 6, wherein the placings in contact of the organic solutions with the aqueous solutions are effected in exchange columns.

17. Method according to claim 14, wherein operation takes place continuously, wherein in each stage of the method the aqueous solution (A0, A2, A4 or A6) is placed in contact with the corresponding organic solution (O0, O1, O2 or O3) by making the two solutions circulate counter-flow, and wherein the aqueous solution A3 is recycled.

18. Method according to claim 17, wherein the aqueous solution A5 is recycled.

* * * * *

UNITED STATES PATENT AND TRADEMARK OFFICE
CERTIFICATE OF CORRECTION

PATENT NO. : 5,085,834

DATED : February 4, 1992

INVENTOR(S) : Marc Lemaire et al.

It is certified that error appears in the above-identified patent and that said Letters Patent is hereby corrected as shown below:

On the face of the patent, Section [75] Inventors: The inventor Pierre Doutreluigne's residence should be indicated as --Bagnols Sur Ceze--.

On the face of the patent, Section [56] References Cited insert the following:

--4,186,175   1/1980   Tomaja............204/158R

OTHER REFERENCES

Chemical Abstracts, Vol. 111, No. 6, 1989, Abstract 46006V

Chemical Abstracts, Vol. 107, No. 12, 1986, Abstract 103766m

Chemical Abstracts, Vol. 107, No. 4, 1987, Abstract 29787a

Chemical Abstracts, Vol. 104, No. 20, 1986, Abstract 175397c

UNITED STATES PATENT AND TRADEMARK OFFICE
CERTIFICATE OF CORRECTION

PATENT NO. : 5,085,834

DATED : February 4, 1992

INVENTOR(S) : Marc Lemaire et al.

It is certified that error appears in the above-identified patent and that said Letters Patent is hereby corrected as shown below:

Chemical Abstracts, Vol. 102, No. 14, 1984, Abstract 120874j

Chemical Abstracts, Vol. 102, No. 24, 1985, Abstract 214303z

Chemical Abstracts, Vol. 109, No. 22, 1988, Abstract 198431b

Chemical Abstracts, Vol. No. 2, 1978, Abstract 16088h

Chemical Abstracts, Vol. 104, No. 20, 1990, Abstract 175397c--.

Column 4, Formula (IV) should indicate the repeating ether group as follows:

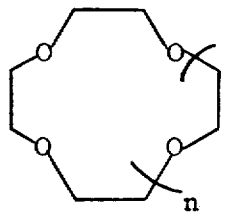

UNITED STATES PATENT AND TRADEMARK OFFICE
CERTIFICATE OF CORRECTION

PATENT NO. : 5,085,834

DATED : February 4, 1992

INVENTOR(S) : Marc Lemaire et al.

It is certified that error appears in the above-identified patent and that said Letters Patent is hereby corrected as shown below:

Column 4, lines 58+, the crown compound structure should show the number one position as follows:

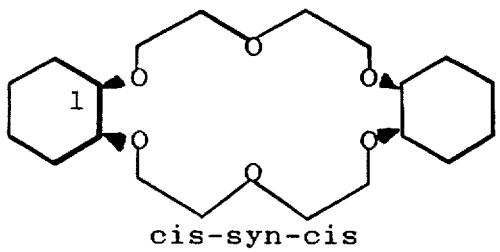

cis-syn-cis

Column 5, lines 14+, the 24 position shown at the 0 atom should be the 21 position.

Column 7, line 4, delete "the" (first occurrence).

Column 7, line 9, after "O1" insert --is--.

Column 7, line 67, delete "O$_3$)by" and insert --O$_3$) by--.

Column 8, line 41, delete "advantage" and insert --advantages--.

Column 9, line 36, delete "for" and insert --of--.

UNITED STATES PATENT AND TRADEMARK OFFICE
CERTIFICATE OF CORRECTION

PATENT NO. : 5,085,834

DATED : February 4, 1992

INVENTOR(S) : Marc Lemaire et al.

It is certified that error appears in the above-identified patent and that said Letters Patent is hereby corrected as shown below:

Column 11, line 27, delete "proces" and insert --process--.

Signed and Sealed this

Twentieth Day of July, 1993

*Attest:*

MICHAEL K. KIRK

*Attesting Officer*     Acting Commissioner of Patents and Trademarks